United States Patent
Luo et al.

(10) Patent No.: US 12,199,669 B2
(45) Date of Patent: Jan. 14, 2025

(54) CONVERTER AND TRANSMISSION SYSTEM

(71) Applicant: Huawei Technologies Co., Ltd., Shenzhen (CN)

(72) Inventors: Qiuyan Luo, Shenzhen (CN); Hanguo Li, Shenzhen (CN); Yanbing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 18/148,294

(22) Filed: Dec. 29, 2022

(65) Prior Publication Data

US 2023/0133846 A1 May 4, 2023

Related U.S. Application Data

(63) Continuation of application No. PCT/CN2021/082267, filed on Mar. 23, 2021.

(30) Foreign Application Priority Data

Jun. 30, 2020 (CN) .......................... 202010614210.5

(51) Int. Cl.
*H04B 10/25* (2013.01)
(52) U.S. Cl.
CPC .................................... *H04B 10/25* (2013.01)
(58) Field of Classification Search
None
See application file for complete search history.

(56) References Cited

U.S. PATENT DOCUMENTS

| | | | |
|---|---|---|---|
| 2009/0060530 A1* | 3/2009 | Biegert | H04Q 11/0067 398/214 |
| 2015/0050022 A1* | 2/2015 | Loredo, Jr. | H04L 12/6418 398/67 |
| 2015/0131993 A1* | 5/2015 | Lutgen | G02B 6/00 398/58 |
| 2016/0269125 A1* | 9/2016 | Brown | H04Q 11/0067 |
| 2018/0331767 A1* | 11/2018 | Shurki | H04B 10/272 |

FOREIGN PATENT DOCUMENTS

| | | |
|---|---|---|
| CN | 205540171 U | 8/2016 |
| CN | 106464369 A | 2/2017 |
| CN | 111934771 A | 11/2020 |

* cited by examiner

*Primary Examiner* — David W Lambert
(74) *Attorney, Agent, or Firm* — Slater Matsil, LLP

(57) ABSTRACT

Embodiments of this application disclose a converter and a transmission system that are configured to effectively ensure successful signal transmission between a network device and a terminal device. The converter is configured to connect to a first cable, the first cable is a photoelectric composite cable, and the first cable includes an optical fiber configured to transmit an optical signal with a passive optical network PON protocol format and a first transmission line configured to transmit a first power supply current. The first transmission line is connected to a conversion unit, the conversion unit is further configured to connect to a data interface, and the data interface is configured to transmit an electrical signal with a target protocol format.

20 Claims, 5 Drawing Sheets

CONVERTER AND TRANSMISSION SYSTEM

CROSS-REFERENCE TO RELATED APPLICATIONS

This application is a continuation of International Application No. PCT/CN2021/082267, filed on Mar. 23, 2021, which claims priority to Chinese Patent Application No. 202010614210.5, filed on Jun. 30, 2020. The disclosures of the aforementioned applications are hereby incorporated by reference in their entireties.

TECHNICAL FIELD

This application relates to the field of optical fiber communication, and in particular, to a converter and a transmission system.

BACKGROUND

As a broadband optical access technology, a passive optical network (PON) is characterized by a structure of point-to-multipoint physical topology. Signal interaction may be performed between a network device and a terminal device by using the PON. However, with diversified development of an application scenario in which the PON is applied, an amount of data exchanged a data quantity of interaction between the network device and the terminal device is increasingly large.

In many scenarios, an interface type of a data interface of the terminal device is different from an interface type of a PON interface of the network device. To implement signal interaction between the network device and the terminal device by using the PON, an intermediate device that is configured to implement an interconnection between the data interface on a side of the terminal device and the PON interface needs to be arranged between the network device and the terminal device.

In a conventional technology, the terminal device supplies power to the intermediate device, but some terminal devices do not have a power supply capability, such as a virtual reality (VR) helmet. As a result, the terminal device cannot supply power to the intermediate device, and signal interaction cannot be performed between the network device and the terminal device.

SUMMARY

This application provides a converter and a transmission system to reduce complexity of a network architecture of a PON and improve a success rate of signal interaction between a network device and a terminal device.

According to a first aspect, this application provides a converter. The converter includes a conversion unit. The converter is configured to connect to a first cable. The first cable is a photoelectric composite cable. The first cable includes an optical fiber configured to transmit an optical signal with a passive optical network PON protocol format and a first transmission line configured to transmit a first power supply current. The first transmission line is connected to the conversion unit, the conversion unit is further configured to connect to a data interface, and the data interface is configured to transmit an electrical signal with a target protocol format. The conversion unit is configured to obtain the first power supply current by using the first transmission line. The conversion unit is configured to receive the optical signal with the PON protocol format from the optical fiber. The conversion unit is configured to convert the optical signal with the PON protocol format into the electrical signal with the target protocol format. The conversion unit is configured to transmit the electrical signal with the target protocol format to the data interface. The conversion unit is configured to receive the electrical signal with the target protocol format from the data interface. The conversion unit is configured to convert the electrical signal with the target protocol format into the optical signal with the PON protocol format. The conversion unit is configured to transmit the optical signal with the PON protocol format to the optical fiber.

It can be learned that the network device can implement, by using the photoelectric composite cable connected between the network device and the converter, interaction that is of the optical signal with the PON protocol format with the converter and that is performed by the network device by using the photoelectric composite cable, and can further implement a purpose that the network device supplies power to the converter. This effectively avoids a case in which the converter cannot normally work because the converter is not powered, and can further reduce a quantity of cables connected between the network device and the conversion unit, thereby reducing complexity of a connection between the network device and the conversion unit.

Based on the first aspect, in an optional implementation, the converter further includes a power supply selection unit. The power supply selection unit is separately connected to the conversion unit, the data interface, and a photoelectric composite interface. The photoelectric composite interface is connected to the first cable. The power supply selection unit is configured to obtain the first power supply current from the photoelectric composite interface and is configured to obtain a second power supply current from the data interface.

It can be learned that the power supply selection unit can obtain the first power supply current and the second power supply current, and the power supply selection unit can select one power supply current from the first power supply current and the second power supply current to supply power to the conversion unit, thereby effectively ensuring successful power supply to the conversion unit.

Based on the first aspect, in an optional implementation, the converter includes the photoelectric composite interface. The photoelectric composite interface is separately connected to the first transmission line and the power supply selection unit, and the photoelectric composite interface is further separately connected to the optical fiber and the conversion unit.

Based on the first aspect, in an optional implementation, the converter includes the first cable.

Based on the first aspect, in an optional implementation, the converter includes the data interface, and the converter further includes a second transmission line and a data cable. The data interface is connected to the power supply selection unit by using the second transmission line, and the data interface is connected to the conversion unit by using the data cable. The second transmission line is configured to transmit the second power supply current. The data cable is configured to transmit the electrical signal with the target protocol format.

Based on the first aspect, in an optional implementation, the converter includes a second cable and the data interface connected to the second cable. The second cable includes a second transmission line and a data cable. The second transmission line is separately connected to the power supply selection unit and the data interface, and the data cable is separately connected to the conversion unit and the data interface. The second transmission line is configured to transmit the second power supply current, and the data cable is configured to transmit the electrical signal with the target protocol format.

Based on the first aspect, in an optional implementation, the power supply selection unit is configured to: when the first power supply current and the second power supply current are obtained, transmit the first power supply current to the conversion unit.

It can be learned that the power supply selection unit selects the first power supply current to supply power to the conversion unit. Because power supply of a first power source of the network device is stable, supplying power to the conversion unit by using the first power source ensures working stability of the conversion unit, and avoids a case in which a sudden power failure occurs and consequently the conversion unit cannot perform signal protocol conversion and transmission. In addition, supplying power to the conversion unit by using the network device can adapt to more application scenarios.

Based on the first aspect, in an optional implementation, the power supply selection unit is configured to transmit, to the conversion unit, a power supply current that is in the first power supply current and the second power supply current and that has a larger value of a preset parameter.

Based on the first aspect, in an optional implementation, the preset parameter is a current value, a voltage value, or a power value.

It can be learned that, supplying power to the conversion unit by using the power supply current that is in the first power supply current and the second power supply current and that has the larger value of the preset parameter improves efficiency of supplying power to the conversion unit.

Based on the first aspect, in an optional implementation, the photoelectric composite interface is a photoelectric composite socket. The photoelectric composite socket is configured to be inserted by a photoelectric composite plug of the first cable. A first end of the photoelectric composite plug includes a first through hole configured to be penetrated by the first cable, and a second end of the photoelectric composite plug includes a connector. A first end of the connector includes a second through hole configured to be penetrated by the optical fiber, and a second end of the connector has an opening. The optical fiber successively passing through the first through hole and the second through hole extends into the connector. When the photoelectric composite plug is inserted into the photoelectric composite socket, a position of the opening is opposite to a position of the conversion unit. The connector is configured to transmit, between the optical fiber and the conversion unit, the optical signal with the PON protocol format.

It can be learned that, the photoelectric composite plug is inserted into the photoelectric composite socket, so that the optical signal with the PON protocol format is transmitted between the conversion unit and the photoelectric composite cable. In addition, using a non-transparent connector can effectively avoid light leakage, thereby improving transmission efficiency of the optical signal with the PON protocol format.

Based on the first aspect, in an optional implementation, the first transmission line includes a first positive electrode transmission line and a first negative electrode transmission line. The photoelectric composite plug includes a first electric conductor and a second electric conductor. The first electric conductor is connected to a positive electrode of the first power source by using the first positive electrode transmission line, and the second electric conductor is connected to a negative electrode of the first power source by using the first negative electrode transmission line. The photoelectric composite socket includes a third electric conductor and a fourth electric conductor. When the photoelectric composite plug is inserted into the photoelectric composite socket, the first electric conductor and the third electric conductor are attached to each other in a connection relationship, the second electric conductor and the fourth electric conductor are attached to each other in a connection relationship, and the third electric conductor and the fourth electric conductor are separately connected to the power supply selection unit.

It can be learned that, the photoelectric composite plug is inserted into the photoelectric composite socket, so that a connection relationship between the first power source and the conversion unit can be directly implemented, thereby improving efficiency of supplying power to the converter by using the first power source. In addition, a stable structure between the photoelectric composite plug and the photoelectric composite socket effectively avoids detachment between the photoelectric composite plug and the photoelectric composite socket, thereby effectively improving stability of a connection relationship between the first power source and the converter.

Based on the first aspect, in an optional implementation, the data interface is a universal serial bus (universal serial bus, USB) interface. The conversion unit is configured to: convert the optical signal with the PON protocol format from the optical fiber into an electrical signal with an Ethernet protocol format, convert the electrical signal with the Ethernet protocol format into an electrical signal with a USB protocol format, and transmit the electrical signal with the USB protocol format to the data interface. The conversion unit is further configured to: convert the electrical signal with the USB protocol format from the data interface into the electrical signal with the Ethernet protocol format, convert the electrical signal with the Ethernet protocol format into the optical signal with the PON protocol format, and transmit the optical signal with the PON protocol format to the optical fiber.

It can be learned that, when no other component and/or network needs to be arranged between the network device and the terminal device, interaction between the optical signal with the PON protocol format transmitted by the network device and the electrical signal with the USB protocol format transmitted by the terminal device may be implemented. This effectively reduces complexity of the transmission system, can be efficiently applied to a plurality of PON-based scenarios, improves efficiency of signal interaction between the network device and the terminal device, and reduces network architecture costs for signal interaction between the network device and the intermediate device.

Based on the first aspect, in an optional implementation, the converter includes an optical fiber connector. The first cable is connected between the optical fiber connector and the photoelectric composite interface. The optical fiber connector is configured to transmit the optical signal with the PON protocol format.

Based on the first aspect, in an optional implementation, the first cable is configured to connect to the optical fiber connector, and the optical fiber connector is configured to transmit the optical signal with the PON protocol format.

Based on the first aspect, in an optional implementation, the optical fiber connector is a photoelectric composite connector, and the photoelectric composite connector is further configured to transmit the first power supply current.

Based on the first aspect, in an optional implementation, the first cable is connected to both the optical fiber connector and a power supply plug. The first transmission line is connected between the power supply plug and the power supply selection unit. The power supply plug is connected to the first power source, and the power supply plug is configured to transmit, to the power supply selection unit, the first power supply current from the first power source by using the first transmission line.

Based on the first aspect, in an optional implementation, a type of the optical fiber connector is any one of the following: a ferrule connector (FC) optical fiber connector, a subscriber connector (SC) optical fiber connector, a lucent connector (LC) optical fiber connector, a straight tip (ST) optical fiber connector, or a fiber distributed data interface (FDDI) optical fiber connector.

Based on the first aspect, in an optional implementation, the data interface is any one of the following: a USB interface, a USB Type-C interface (USB Type-C), a USB-to-serial adapter, a micro power Internet of Things USB adapter, a wireless network (Wi-Fi) adapter, a high-definition multimedia interface (HDMI), or an Ethernet link aggregation (Eth-Trunk) interface.

Based on the first aspect, in an optional implementation, the data interface is a USB interface, and the converter further includes a connection module. A first end of the connection module is connected to the USB interface, and a second end of the connection module is disposed as any one of the following: a USB Type-C interface, a USB-to-serial adapter, a micro power Internet of Things USB adapter, a Wi-Fi adapter, an HDMI interface, or an Eth-Trunk interface.

According to a second aspect, this application provides a transmission system. The transmission system includes a network device and a terminal device. The network device and the terminal device are connected by using a converter. The converter is shown in the first aspect.

DETAILED DESCRIPTION OF ILLUSTRATIVE EMBODIMENTS

The following clearly and completely describes the technical solutions in embodiments of this application with reference to the accompanying drawings in embodiments of this application. It is clear that the described embodiments are merely some rather than all of embodiments of this application. All other embodiments obtained by persons skilled in the art based on embodiments of this application without creative efforts shall fall within the protection scope of this application.

Figure 1:
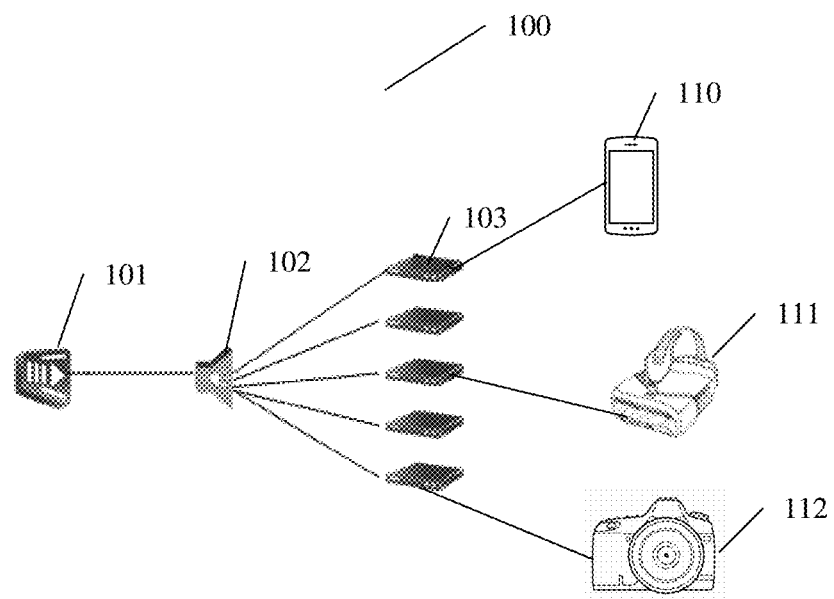
FIG. 1 is an example diagram of a network architecture of a passive optical network according to the conventional technology.

To better understand this application, a network architecture of an existing PON is first described below with reference to FIG. 1. FIG. 1 is an example diagram of a network architecture of a passive optical network according to the conventional technology.

It can be learned from FIG. 1 that, the PON 100 includes an optical line terminal (OLT) 101, an optical distribution network (ODN) 102, and a plurality of optical network units (ONUs) 103. The OLT 101 is connected to the plurality of ONUs 103 in a point-to-multipoint manner by using the ODN 102. The PON 100 may use a network type of a gigabit passive optical network (GPON), and the PON 100 may alternatively use a subsequent network type with a higher rate, such as a 25G passive optical network (25G PON), a 50G passive optical network (50G PON), or a 100G passive optical network (100G PON).

The ODN 102 may be a communication network that does not require any active device to implement signal interaction between the OLT 101 and the ONU 103. The OLT 101 may serve as a medium between the ONU 103 and an upper-layer network, forward data obtained from the upper-layer network as downlink data to the ONU 103, and forward uplink data obtained from the ONU 103 to the upper-layer network. For example, the upper-layer network may be an optical transport network (OTN).

The ONU 103 is configured to communicate with the terminal device located on a user side. A specific device type of the terminal device is not limited in this embodiment. For example, the terminal device may be a smartphone 110, a VR helmet 11, or an industrial camera 112 shown in FIG. 1. Description of the device type of the terminal device is an optional example, and is not limited. The terminal device may be alternatively a smart tablet, VR glasses, an industrial personal computer (IPC), a computer, a television, or the like.

It can be learned that in a network architecture of the PON shown in FIG. 1, the ODN 102, the ONU 103, and the like need to be disposed between the OLT and the terminal device to implement signal interaction. This increases complexity of the network architecture of the PON. A network architecture of the transmission system provided in this application is described below with reference to FIG. 2.

The transmission system shown in this embodiment includes the network device 201 and the terminal device. The terminal device is configured to perform signal interaction with the network device 201. For specific descriptions of the terminal devices 110, 111, and 112 shown in this embodiment, refer to FIG. 1 for details. Details are not described again. This embodiment imposes no limitation on a specific device type of the network device 201, provided that the network device 201 can perform signal interaction with the terminal device by using a converter 220. For example, the network device 201 may be the OLT 101 shown in FIG. 1.

Figure 2:
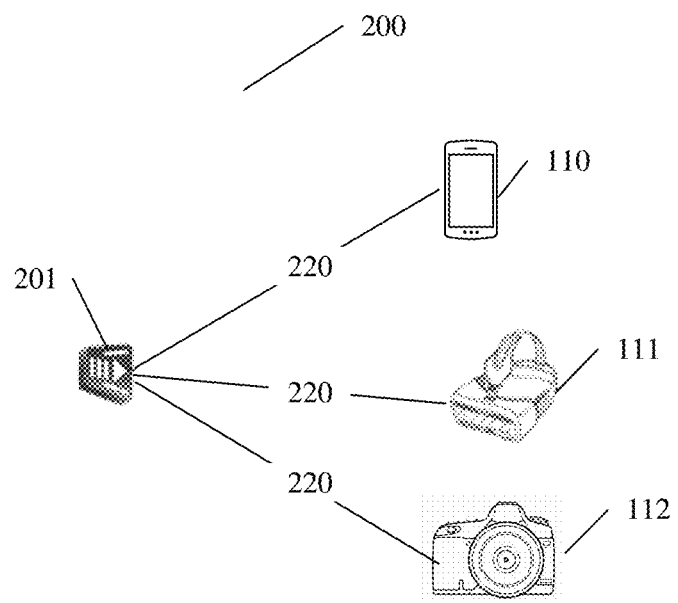
FIG. 2 is an example diagram of a network architecture of an embodiment of a transmission system according to this application.

It can be learned from comparison between FIG. 1 and FIG. 2 that the network device 201 shown in the transmission system provided in this application can implement signal interaction with the terminal device only by using the converter 220, and the ODN, the ONU, or the like does not need to be disposed. This reduces complexity of the network architecture of the transmission system, and improves reliability and efficiency of data transmission performed by the transmission system. Several structures of the converter provided in this application are described below.

Structure 1

Figure 3:
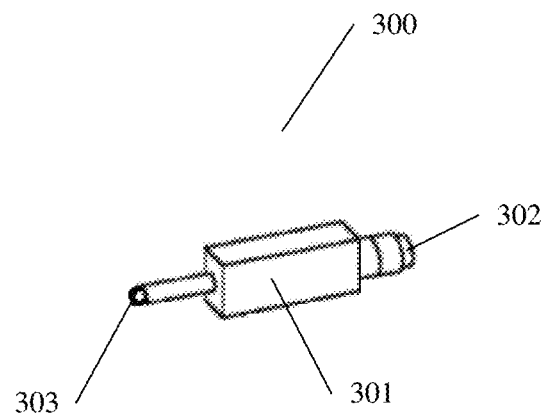
FIG. 3 is an example diagram of a structure of a first embodiment of a converter according to this application.

The following description is provided with reference to FIG. 3. FIG. 3 is an example diagram of a structure of a first embodiment of a converter according to this application. It can be learned from FIG. 3 that the converter 300 shown in this embodiment includes a converter housing 301, and the converter housing 301 includes a data interface 302 and a photoelectric composite interface 303. As shown in this structure, an example in which both the data interface 302 and the photoelectric composite interface 303 protrude from the converter housing 301 is used for description. In another example, both the data interface 302 and the photoelectric composite interface 303 may be alternatively disposed in the converter housing 301. This is not specifically limited in this embodiment. The data interface 302 is connected to the terminal device, and the photoelectric composite interface 303 is connected to the network device.

A specific interface type of the data interface 302 is not limited in this embodiment. For example, the interface type of the data interface 302 may be any one of the following: a USB interface, a USB Type-C interface, a USB-to-serial adapter, a micro power Internet of Things USB adapter, a Wi-Fi adapter, an HDMI interface, an Eth-Trunk interface, or the like. In this embodiment, an example in which an interface type of the data interface 302 is a USB interface is used, and the data interface 302 is a USB male connector interface. To implement a connection between the converter and the terminal device, the terminal device may include a USB female connector interface that matches the USB male connector interface. When the USB male connector interface is inserted into the USB female connector interface, a connection between the converter and the terminal device is implemented, and then interaction of the electrical signal with the USB protocol format may be performed between the terminal device and the converter. In another example, the data interface 302 may be alternatively a USB female connector interface, and the terminal device includes a USB male connector interface that matches the USB female connector interface, to implement a connection between the converter and the terminal device.

Figure 4:
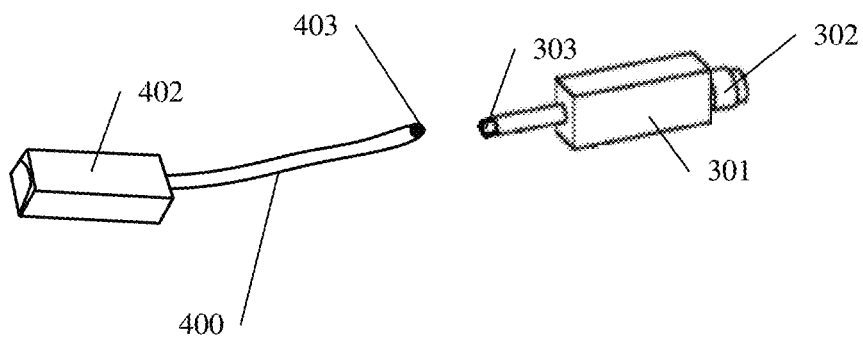
FIG. 4 is an example diagram of a connection structure of an embodiment of a converter and a first cable according to this application.

This embodiment imposes no limitation on a specific structure of the photoelectric composite interface 303, provided that the photoelectric composite interface 303 is configured to connect to the first cable. For a specific connection structure, refer to FIG. 4. FIG. 4 is an example diagram of a connection structure of an embodiment of a converter and a first cable according to this application.

The photoelectric composite interface 303 shown in this structure is configured to connect to a first cable 400. Because the converter shown in this structure does not include the first cable 400, the first cable 400 and the photoelectric composite interface 303 shown in FIG. 4 are separated. In a scenario in which signal interaction between the network device and the terminal device needs to be implemented by using the converter, the first cable 400 may be inserted into the photoelectric composite interface 303, to implement a connection between the network device and the converter 300.

To implement the connection between the network device and the converter 300, the network device includes an adaptation optical fiber connector. The adaptation optical fiber connector is a PON interface. Two ends of the first cable 400 respectively include an optical fiber connector 402 and a photoelectric composite plug 403. When the optical fiber connector 402 is inserted into the adaptation optical fiber connector, a connection between the network device and the first cable 400 can be implemented. When the photoelectric composite plug 403 is inserted into the photoelectric composite interface 303, a connection between the first cable 400 and the converter 300 can be implemented.

Figure 5:
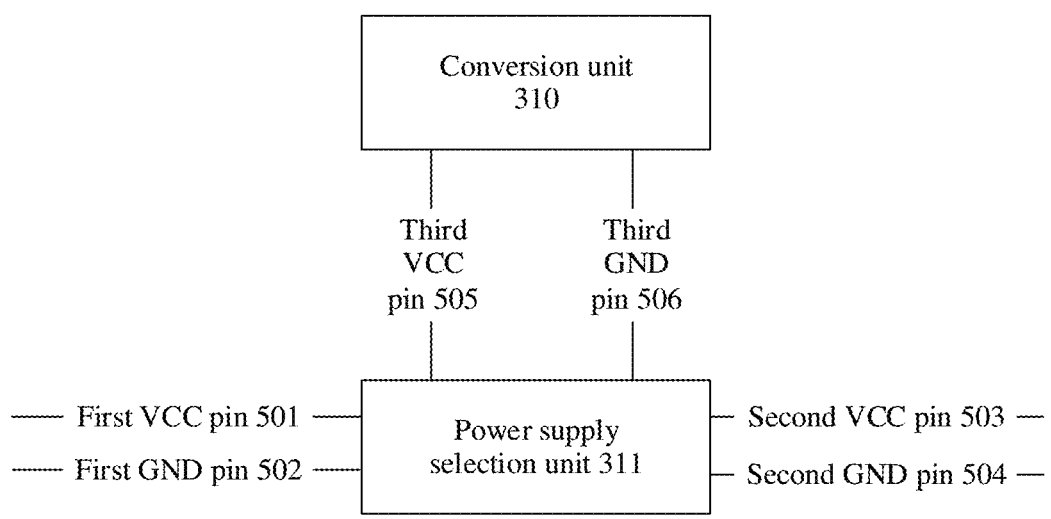
FIG. 5 is an example diagram of a structure of an embodiment inside a converter according to this application.

An internal structure of the converter is described below with reference to FIG. 5. FIG. 5 is an example diagram of a structure of an embodiment inside a converter according to this application. It can be learned from FIG. 5 that, the converter internally includes a power supply selection unit 311 and a conversion unit 310 that are interconnected. The power supply selection unit 311 is configured to supply power to the conversion unit 310. When being powered by the power supply selection unit 311, the conversion unit 310 may convert the optical signal with the PON protocol format from a network device into the electrical signal with the USB protocol format. The conversion unit 310 can further convert the electrical signal with a USB protocol format from the terminal device into the optical signal with the PON protocol format.

It should be noted that, in this embodiment, an example in which the converter internally includes a power supply selection unit is used for description. In another example, a power supply selection unit may not be disposed in the converter, and a first transmission line that is included in the first cable and that is configured to transmit a first power supply current may be directly connected to the conversion unit, so that the first transmission line can directly transmit the first power supply current to the conversion unit.

This embodiment imposes no limitation on specific device forms of the power supply selection unit 311 and the conversion unit 310. The conversion unit 310 is used as an example. The conversion unit 310 may be one or more chips, or one or more integrated circuits. For example, the conversion unit 310 may be one or more field programmable gate arrays (FPGAs), application-specific integrated circuits (ASICs), systems on chip (SoC), central processing units (CPUs), network processors (NPs), micro controller units (MCUs), programmable logic devices (PLDs) or other integrated chips, or any combination of the foregoing chips or processors. For description of the device form of the power supply selection unit 311, refer to the description of the conversion unit 310. Details are not described again.

To implement a function of the conversion unit 310, power needs to be supplied to the conversion unit 310. It can be learned that the conversion unit 310 shown in this embodiment is an active device. In this embodiment, power may be supplied to the conversion unit 310 by using the first power supply current from the network device and the second power supply current from the terminal device. It should be noted that, in this embodiment, an example in which a first power source that is configured to send a first power supply current to the conversion unit 310 is located in the network device is used for description. In another example, the first power source may be alternatively located outside the network device. In this embodiment, an example in which a second power source that is configured to send a second power supply current to the conversion unit 310 is located in the terminal device is further used for description. In another example, the second power source may be alternatively located outside the terminal device.

A process of transmitting the first power supply current to the power supply selection unit 311 is described below.

The first cable 400 shown in this embodiment is a photoelectric composite cable (PCC). The photoelectric composite cable is a cable that integrates an optical fiber and a first transmission line. The optical fiber included in the photoelectric composite cable is configured to transmit the optical signal with the PON protocol format. The first transmission line is configured to transmit the first power supply current, and the first power supply current is configured to supply power to the conversion unit 310.

Specifically, a first power source is disposed in the network device shown in this embodiment, and the first transmission line included in the first cable 400 specifically includes a first positive electrode transmission line and a first negative electrode transmission line. The first positive electrode transmission line is connected to a positive electrode of the first power source, and the first negative electrode transmission line is connected to a negative electrode of the first power source.

The power supply selection unit 311 shown in this embodiment includes a first positive electrode (VCC) pin 501 and a first negative electrode (GND) pin 502. The first VCC pin 501 is connected to the first positive electrode transmission line. Specifically, the first VCC pin 501 and the first positive electrode transmission line may be connected by using a conducting wire inside the converter. It can be learned that the power supply selection unit 311 is connected to the positive electrode of the first power source successively by using the first VCC pin 501 and the first positive electrode transmission line. The first GND pin 502 is connected to the first negative electrode transmission line. Specifically, the first GND pin 502 and the first negative electrode transmission line may be connected by using a conducting wire inside the converter. It can be learned that the power supply selection unit 311 is connected to the negative electrode of the first power source successively by using the first GND pin 502 and the first negative electrode transmission line, to implement that the first power source transmits the first power supply current to the power supply selection unit 311.

A process of transmitting the second power supply current to the power supply selection unit 311 is described below.

The power supply selection unit 311 shown in this embodiment further includes a second VCC pin 503 and a second GND pin 504. In this embodiment, an example in which the data interface 302 is a USB male connector is used, so that a USB female connector that can match the USB male connector is disposed in the terminal device. The USB male connector includes a first contact and a second contact. The first contact is connected to the second VCC pin 503, and the second contact is connected to the second GND pin 504. When the USB female connector includes a third contact and a fourth contact, and the USB male connector is inserted into the USB female connector, the third contact is connected to the first contact, and the fourth contact is connected to the second contact. The terminal device includes a third transmission line. The third transmission line is configured to implement a connection between the USB female connector and the second power source. It can be learned that, when the USB male connector is inserted into the USB female connector, the second power supply current of the second power source can be transmitted to the data interface 302 by using the third transmission line, to implement that the second power source transmits the second power supply current to the power supply selection unit 311.

When the power supply selection unit 311 obtains both the first power supply current and the second power supply current, the power supply selection unit 311 may transmit one of the power supply currents to the conversion unit 310. Specifically, the power supply selection unit 311 further includes a third VCC pin 505 and a third GND pin 506. Both the third VCC pin 505 and the third GDN pin 506 are connected to the conversion unit 310, so that when obtaining the first power supply current and the second power supply current, the power supply selection unit 311 can select one of the power supply currents and transmit the selected power supply current to the conversion unit 310 by using the third VCC pin 505 and the third GDN pin 506, so that the conversion unit 310 implements a corresponding function when being powered. A function of the conversion unit 310 is described below.

To implement that the network device transmits the optical signal with the PON protocol format to the terminal device, the network device transmits the optical signal with the PON protocol format to the conversion unit 310 successively by using an adaptation optical fiber connector, an optical fiber connector 402, and an optical fiber in the first cable 400. The conversion unit 310 is configured to convert the optical signal with the PON protocol format into the electrical signal with the USB protocol format.

The data interface 302 shown in this embodiment is further separately connected to the conversion unit 310 and a data cable located in the terminal device. The data cable may be connected to a processing chip in the terminal device. It can be learned that the conversion unit 310 may transmit the electrical signal with the USB protocol format to the processing chip successively by using the data interface 302 and the data cable in the terminal device, so that the processing chip can process the electrical signal with the USB protocol format.

To implement that the terminal device transmits the electrical signal with the USB protocol format to the network device, the processing chip in the terminal device transmits the electrical signal with the USB protocol format to the conversion unit 310 successively by using the data cable in the terminal device and the data interface 302. The conversion unit 310 may convert the electrical signal with the USB protocol format into the optical signal with the PON protocol format, and the conversion unit 310 transmits the electrical signal with the USB protocol format to the network device successively by using an optical fiber in the first cable 400, the optical fiber connector 402, and the adaptation optical fiber connector.

Structure 2

Figure 6:
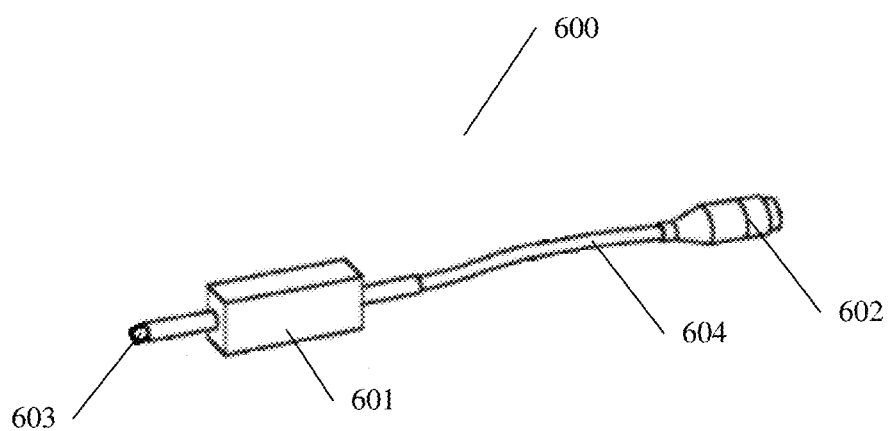
FIG. 6 is an example diagram of a structure of a second embodiment of a converter according to this application.

The following description is provided with reference to FIG. 6. FIG. 6 is an example diagram of a structure of a second embodiment of a converter according to this application. It can be learned from FIG. 6 that the converter 600 shown in this embodiment includes a converter housing 601, and the converter housing 601 includes a photoelectric composite interface 603. For specific descriptions of the converter housing 601 and the photoelectric composite interface 603, refer to FIG. 3 for details. Details are not described again in the example.

In this example, the converter 600 includes a second cable 604, and the second cable 604 is connected between a data interface 602 and the converter housing 601. For a specific description of the data interface 602, refer to the foregoing structure 1 for details. Details are not described again.

Specifically, an internal structure of the converter housing 601 shown in this structure is shown in FIG. 5, and details are not described again. The second cable 604 includes a second transmission line and a data cable. The second transmission line is connected to the power supply selection unit 311. When the data interface 602 is connected to the terminal device, the second power source in the terminal device may transmit the second power supply current to the power supply selection unit 311 by using the second transmission line.

The data cable included in the second cable 604 is connected to the conversion unit 310. The terminal device may transmit the electrical signal with the target protocol format to the conversion unit 310 by using the data cable. For specific descriptions of the power supply selection unit 311 and the conversion unit 310, refer to FIG. 5 for details. Details are not described again.

Structure 3

Figure 7:
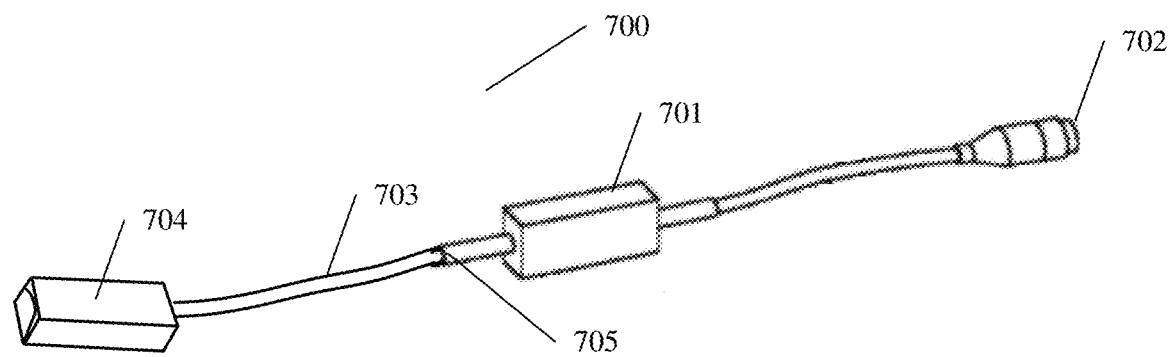
FIG. 7 is an example diagram of a structure of a third embodiment of a converter according to this application.

The following description is provided with reference to FIG. 7. FIG. 7 is an example diagram of a structure of a third embodiment of a converter according to this application. It can be learned from FIG. 7 that the converter 700 shown in this embodiment includes a converter housing 701 and a data interface 702. For specific descriptions of the converter housing 701 and the data interface 702, refer to FIG. 6 for details. Details are not described again in the example.

The converter 700 shown in this structure further includes a first cable 703 and an optical fiber connector 704. The first cable 703 is connected between the optical fiber connector 704 and a photoelectric composite interface 705. For specific descriptions of the first cable 703, the photoelectric composite interface 705, and the internal structure of the converter, refer to the foregoing structure 1. Details are not described again. In this embodiment, an example in which the converter 700 includes the optical fiber connector 704 is used for description. In another example, the converter 700 may alternatively include the first cable 703, but does not include the optical fiber connector 704, provided that the first cable 703 can be connected to the optical fiber connector 704. The optical fiber connector 704 is described below.

The optical fiber connector 704 is a photoelectric composite connector, and the photoelectric composite connector is configured to transmit, to the first cable, the optical signal with the PON protocol format and the first power supply current from the first power source. It can be learned that, the optical fiber connector serving as the photoelectric composite connector has functions of transmitting the optical signal with the PON protocol format and transmitting the first power supply current.

A specific structure of the photoelectric composite connector is not limited in this embodiment. For example, the photoelectric composite connector has a ferrule assembly and a conductive terminal. The ferrule assembly is configured to connect a cable in the network device and an optical fiber included in the first cable, so that the ferrule assembly can obtain the optical signal with the PON protocol format by using the cable in the network device, and transmit the optical signal with the PON protocol format to the optical fiber included in the first cable. The ferrule assembly can further obtain, by using the optical fiber included in the first cable, the optical signal with the PON protocol format from the conversion unit, and transmit the optical signal with the PON protocol format to the cable in the network device.

The conductive terminal is made of conductor materials such as copper and copper alloys, and aluminum and aluminum alloys. The conductive terminal is connected to the first power source, and the conductive terminal is further connected to the first transmission line included in the first cable. In this way, the conductive terminal may obtain the first power supply current from the first power source, and transmit the first power supply current to the first transmission line of the first cable.

Because the optical fiber connector 704 can transmit the optical signal with the PON protocol format, and can further transmit the first power supply current, a quantity of devices of the converter is effectively reduced, and complexity of a structure of the converter is reduced. This helps improve density of the disposed converter in a specific space range. Through a plug-and-unplug connection between the optical fiber connector 704 and the network device, power supply and network access can be simultaneously implemented, thereby improving efficiency of constructing a transmission system.

Structure 4

Figure 8:
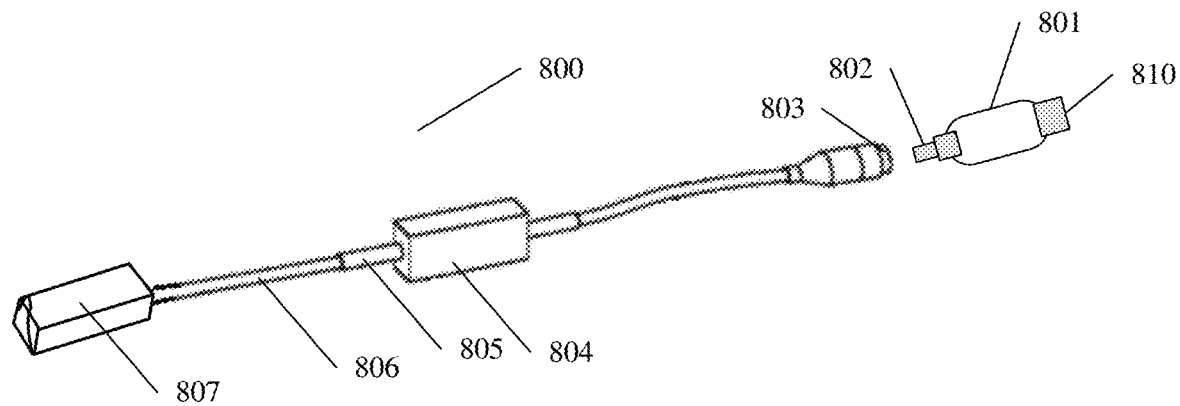
FIG. 8 is an example diagram of a structure of a fourth embodiment of a converter according to this application.

The following description is provided with reference to FIG. 8. FIG. 8 is an example diagram of a structure of a fourth embodiment of a converter according to this application. It can be learned from FIG. 8 that the converter 800 shown in this embodiment further includes a connection module 801. A first end 802 of the connection module 801 is connected to the data interface 803. For a specific description of the data interface 803, refer to the foregoing embodiment for details. Details are not described again. The connection module 801 is inserted into the data interface 803. For example, if the data interface 803 is a USB female connector interface, the first end 802 of the connection module 801 is a USB male connector interface that matches the USB female connector interface.

For specific descriptions of the converter housing 804, the photoelectric composite interface 805, the first cable 806, and the optical fiber connector 807 included in the converter shown in this structure, refer to FIG. 7 for details. Details are not described again.

To enable the converter 800 shown in this embodiment to be applied to a plurality of scenarios, a second end 810 of the connection module 801 shown in this embodiment may include interfaces configured to adapt to different scenarios. For details, refer to the following example.

Example 1

The second end 810 of the connection module 801 may be a USB Type-C plug. The connection module 801 may connect, by using the second end 810, to a terminal device that has a USB Type-C socket. It can be learned that the terminal device that has a USB Type-C socket can connect to the converter 800 in a manner of connecting to the second end 810. The terminal device that has a USB Type-C socket may be various intelligent terminal devices, such as a smartphone and a tablet computer.

Example 2

The second end 810 of the connection module 801 may be a USB-to-serial adapter, and the USB-to-serial adapter is configured to connect to a terminal device in which a serial interface (SI) is disposed. For example, the terminal device in which the SI is disposed may be various intelligent industrial devices or intelligent traffic terminal devices.

Example 3

The second end 810 of the connection module 801 may be a micro power Internet of Things USB adapter, and access of a terminal device that supports various micro power Internet of Things protocols is implemented by using the micro power Internet of Things USB adapter. The micro power Internet of Things protocol may be any one of the following:

Bluetooth, narrowband Internet of Things (NB-IoT), long range (LoRa), or the like.

Example 4

The second end 810 of the connection module 801 may be a wireless network (Wi-Fi) adapter. The converter 800 with the Wi-Fi adapter can provide requirements for various terminal devices to access a network by using Wi-Fi. This avoids a dead zone of coverage of the Wi-Fi network, and improves a success rate of accessing the Wi-Fi network by the terminal device.

Structure 5

Figure 9:
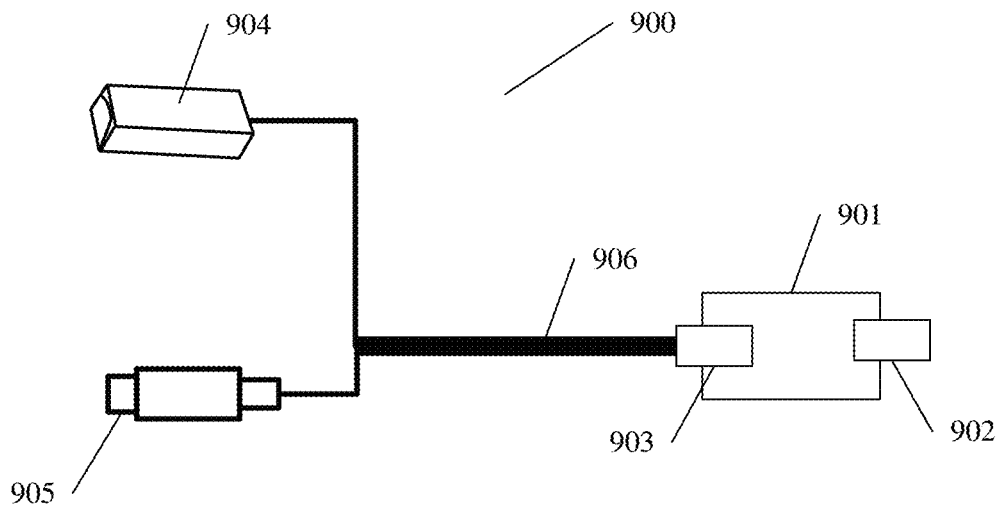
FIG. 9 is an example diagram of a structure of a fifth embodiment of a converter according to this application.

The following description is provided with reference to FIG. 9. FIG. 9 is an example diagram of a structure of a fifth embodiment of a converter according to this application. It can be learned from FIG. 9 that the converter 900 shown in this embodiment includes a converter housing 901. A data interface 902 and a photoelectric composite interface 903 are disposed in the converter housing 901. For descriptions of the converter housing 901, the data interface 902, and the photoelectric composite interface 903, refer to the foregoing embodiment for details. Details are not described again.

The converter 900 shown in this embodiment further includes an optical fiber connector 904. A difference between the optical fiber connector shown in this embodiment and the optical fiber connector shown in FIG. 7 lies in that the optical fiber connector 904 shown in this embodiment does not have a function of transmitting the first power supply current, that is, the optical fiber connector 904 has only a function of transmitting the optical signal with the PON protocol format. For example, a type of the optical fiber connector 904 shown in this embodiment is any one of the following: an FC optical fiber connector, an SC optical fiber connector, an LC optical fiber connector, an ST optical fiber connector, or an FDDI optical fiber connector.

To implement power supply to the conversion unit, the converter shown in this embodiment further includes a power supply plug 905. A first transmission line included in the first cable 906 is connected between the power supply plug 905 and the power supply selection unit. The power supply plug 905 is connected to the first power source, and the power supply plug 905 obtains the first power supply current from the first power source, and transmits the first power supply current to the first transmission line included in the first cable 906. The first transmission line of the first cable 906 may transmit, to the power supply selection unit, the first power supply current from the first power source, so as to implement power supply for the power supply selection unit by using the first power source.

The first cable 906 is separately connected to the optical fiber connector 904 and the power supply plug 905. Specifically, the optical fiber included in the first cable 906 is connected between the optical fiber connector 904 and the conversion unit. The optical fiber is configured to transmit the optical signal with the PON protocol format between the optical fiber connector 904 and the conversion unit. The first transmission line included in the first cable 906 is separately connected to the power supply plug 905 and the power supply selection unit, to transmit the first power supply current to the power supply selection unit.

It can be learned that the converter shown in this structure separately transmits, by using the optical fiber connector 904 and the power supply plug 905, the optical signal with the PON protocol format to the conversion unit and the first power supply current to the power supply selection unit. This helps separately troubleshoot a power supply fault or a network access fault, improve identification of the power supply fault or the network access fault, and improve efficiency of troubleshooting the transmission system.

Figure 10:
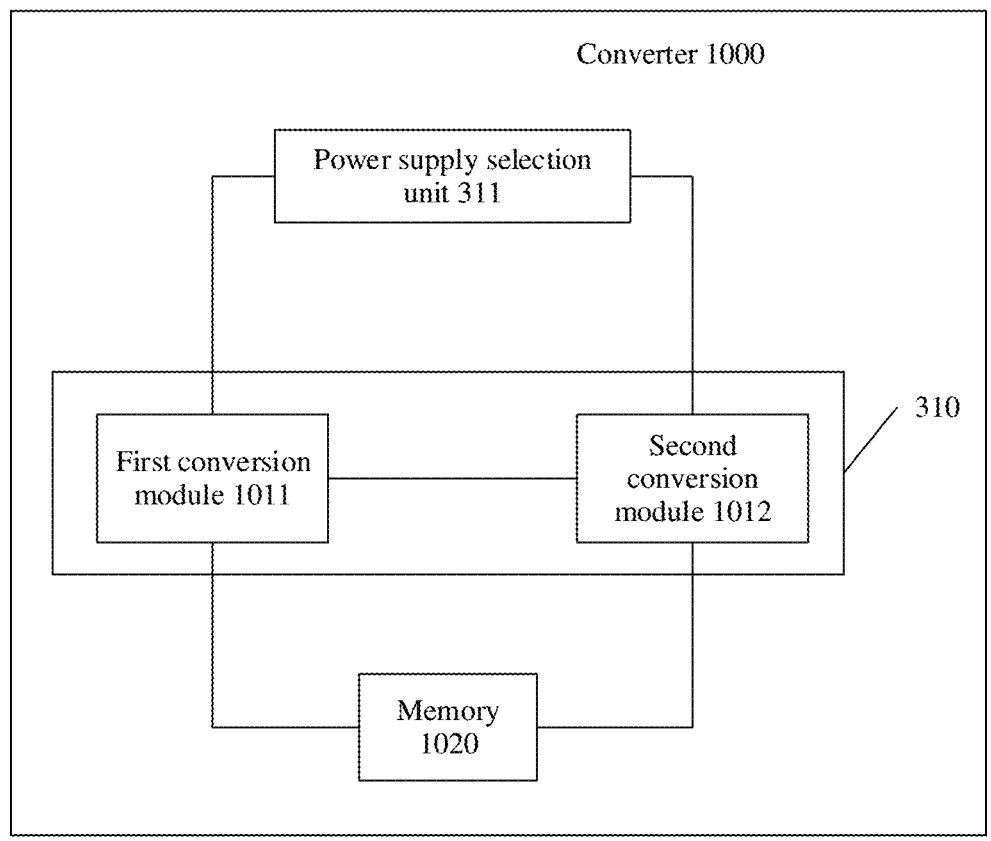
FIG. 10 is an example diagram of a structure of an internal connection of an embodiment of a converter according to this application.

An internal structure of a converter is described below with reference to FIG. 10. FIG. 10 is an example diagram of an internal connection structure of an embodiment of a converter according to this application.

The converter 1000 shown in this embodiment includes a conversion unit 310, a memory 1020, and a power supply selection unit 311. For a manner in which the power supply selection unit 311 is connected to the conversion unit 310, refer to FIG. 5. Details are not described again. The conversion unit 310 is connected to the memory 1020. The conversion unit 310 specifically includes a first conversion module 1011 and a second conversion module 1012. The first conversion module 1011 is connected to the second conversion module 1012, and the first conversion module 1011 is connected to the memory 1020. The second conversion module 1012 is separately connected to the data interface and the memory 1020.

Specifically, the first conversion module 1011 is disposed opposite to a location of the optical fiber, that is, the first conversion module 1011 is located in a transmission direction of an optical signal with the PON protocol format transmitted by the optical fiber, so that the first conversion module 1011 can obtain the optical signal with the PON protocol format from the optical fiber, and the first conversion module 1011 can further transmit the optical signal with the PON protocol format to the optical fiber. The first conversion module 1011 and the second conversion module 1012 are separately connected to the power supply selection unit 311, so that the power supply selection unit 311 can supply power to the first conversion module 1011 and the second conversion module 1012. The memory 1020 is configured to store a computer program. When the first conversion module 1011 and the second conversion module 1012 are powered by the power supply selection unit 311, the computer program stored in the memory 1020 can be read, to implement a corresponding function. Details are as follows:

In a process in which the network device needs to transmit the optical signal with the PON protocol format to the terminal device by using the converter, the network device transmits the optical signal with the PON protocol format to the optical fiber included in the first cable by using the optical fiber connector. The first conversion module 1011 is configured to obtain the optical signal with the PON protocol format from the optical fiber, and is configured to convert the optical signal with the PON protocol format into an electrical signal with an Ethernet protocol format, and transmit the electrical signal to the second conversion module 1012. The second conversion module 1012 is configured to convert the electrical signal with the Ethernet protocol format into the electrical signal with the USB protocol format, and is configured to transmit the electrical signal to a data interface. Then, the data interface may transmit data with the USB protocol format to the terminal device.

In a process in which the terminal device needs to transmit the electrical signal with the USB protocol format to the network device by using the converter, the terminal device transmits the electrical signal with the USB protocol format to the second conversion module 1012 by using the data interface. The second conversion module 1012 is configured to convert the electrical signal with the USB protocol format into the electrical signal with the Ethernet protocol format, and transmit the electrical signal to the first conversion module 1011. The first conversion module 1011 is configured to convert the electrical signal with the Ethernet protocol format into the optical signal with the PON protocol format, and is configured to transmit the optical signal to the network device by using the optical fiber.

A function of the power supply selection unit 311 is described below. Specifically, in this embodiment, different processes in which the power supply selection unit 311 supplies power to the first conversion module 1011 and the second conversion module 1012 based on different obtained power supply currents are specifically as follows:

Power Supply Process 1

If the power supply selection unit 311 obtains the first power supply current and the second power supply current, the power supply selection unit 311 transmits the first power supply current to the first conversion module 1011 and the second conversion module 1012, so that the first conversion module 1011 and the second conversion module 1012 are powered by using the first power supply current.

Specifically, when the power supply selection unit 311 obtains the first power supply current and the second power supply current, it indicates that both the first power source in the network device and the second power source in the terminal device can supply power to the conversion unit 310. The power supply selection unit 311 selects the first power source to supply power to the conversion unit 310.

Optionally, with reference to FIG. 5, when the power supply selection unit 311 obtains the first power supply current and the second power supply current, the power supply selection unit 311 may disconnect a switch between the second VCC pin 503 and the third VCC pin 505, and disconnect a switch between the second GND pin 504 and the third GND pin 506, so that the second power supply current cannot be transmitted to the conversion unit 310, and then the power supply selection unit 311 transmits only the first power supply current to the conversion unit.

Because power supply of the first power source of the network device is stable, supplying power to the conversion unit 310 by using the first power source improves working stability of the conversion unit 310, and avoids a case in which a sudden power failure occurs and consequently the conversion unit 310 cannot perform data transmission. In addition, supplying power to the conversion unit 310 by using the network device can adapt to more application scenarios.

It should be noted that, in this embodiment, an example in which the first power supply current is used to supply power to the conversion unit 310 when the power supply selection unit 311 obtains the first power supply current and the second power supply current is used for description. This is not limited. For example, when the power supply selection unit 311 obtains the first power supply current and the second power supply current, the power supply selection unit 311 may alternatively transmit the second power supply current to the first conversion module 1011 and the second conversion module 1012, so that the second power source is used to supply power to the first conversion module 1011 and the second conversion module 1012.

Power Supply Process 2

When the power supply selection unit 311 obtains the first power supply current and the second power supply current, the power supply selection unit 311 may determine a power supply current that is in the first power supply current and the second power supply current and that has a larger value of a preset parameter. Then, the power supply selection unit 311 may transmit the power supply current having the larger value of the preset parameter to the conversion unit 310.

For example, the preset parameter is a current value. It can be learned that the power supply selection unit 311 determines a larger value in a current value of the first power supply current and a current value of the second power supply current. If the power supply selection unit 311 determines that the current value of the first power supply current is larger than the current value of the second power supply current, the power supply selection unit 311 transmits the first power supply current to the conversion unit 310. If the power supply selection unit determines that the current value of the first power supply current is smaller than the current value of the second power supply current, the power supply selection unit 311 transmits the second power supply current to the conversion unit 310.

For another example, the preset parameter is a voltage value. It can be learned that the power supply selection unit 311 determines a larger value in a voltage value of the first power supply current and a voltage value of the second power supply current. If the power supply selection unit 311 determines that the voltage value of the first power supply current is larger than the voltage value of the second power supply current, the power supply selection unit 311 transmits the first power supply current to the conversion unit 310. If the power supply selection unit determines that the voltage value of the first power supply current is smaller than the voltage value of the second power supply current, the power supply selection unit 311 transmits the second power supply current to the conversion unit 310.

For another example, the preset parameter is a power value. It can be learned that the power supply selection unit 311 determines a larger value in a power value of the first power supply current and a power value of the second power supply current. If the power supply selection unit 311 determines that the power value of the first power supply current is larger than the power value of the second power supply current, the power supply selection unit 311 transmits the first power supply current to the conversion unit 310. If the power supply selection unit determines that the power value of the first power supply current is smaller than the power value of the second power supply current, the power supply selection unit 311 transmits the second power supply current to the conversion unit 310.

Power Supply Process 3

If the power supply selection unit 311 obtains only the first power supply current, it indicates that a circuit of the first power source supplying power to the conversion unit 310 is in an on state, but a circuit of the second power source supplying power to the conversion unit 310 is in an off state. The power supply selection unit 311 transmits the first power supply current to the conversion unit 310, to supply power to the conversion unit 310 by using the first power source.

Power Supply Process 4

If the power supply selection unit obtains only the second power supply current, it indicates that a circuit of the second power source supplying power to the conversion unit 310 is in an on state, but a circuit of the first power source supplying power to the conversion unit 310 is in an off state. The power supply selection unit 311 transmits the second power supply current to the conversion unit 310, to supply power to the conversion unit 310 by using the second power source.

It can be learned from the foregoing description that the first cable can transmit the first power supply current to the power supply selection unit 311, and can further perform interaction of the optical signal having the PON protocol format with the conversion unit 310. A specific implementation process is described below.

Figure 11:
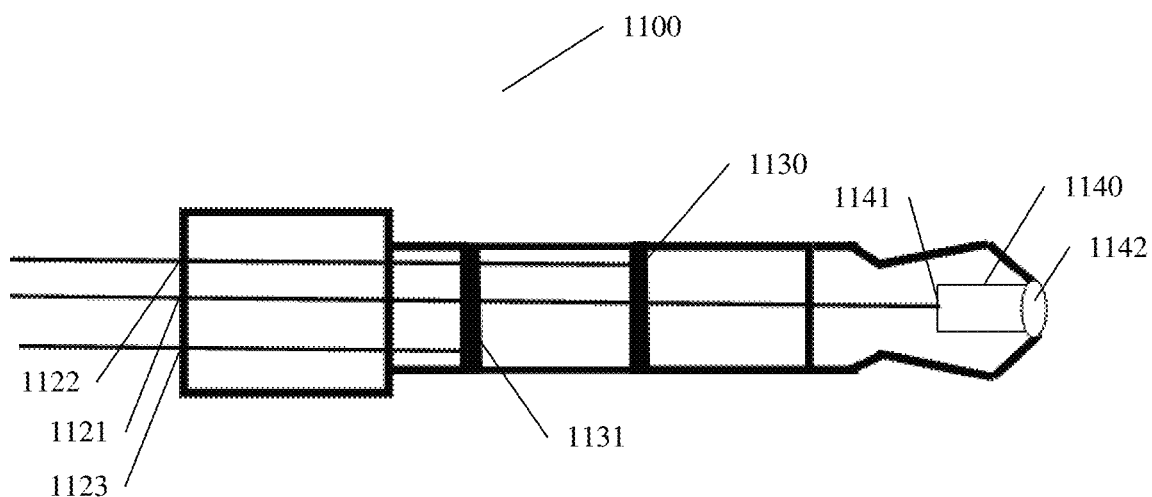
FIG. 11 is an example diagram of a cross-sectional structure of an embodiment of a photoelectric composite plug according to this application.
Figure 12:
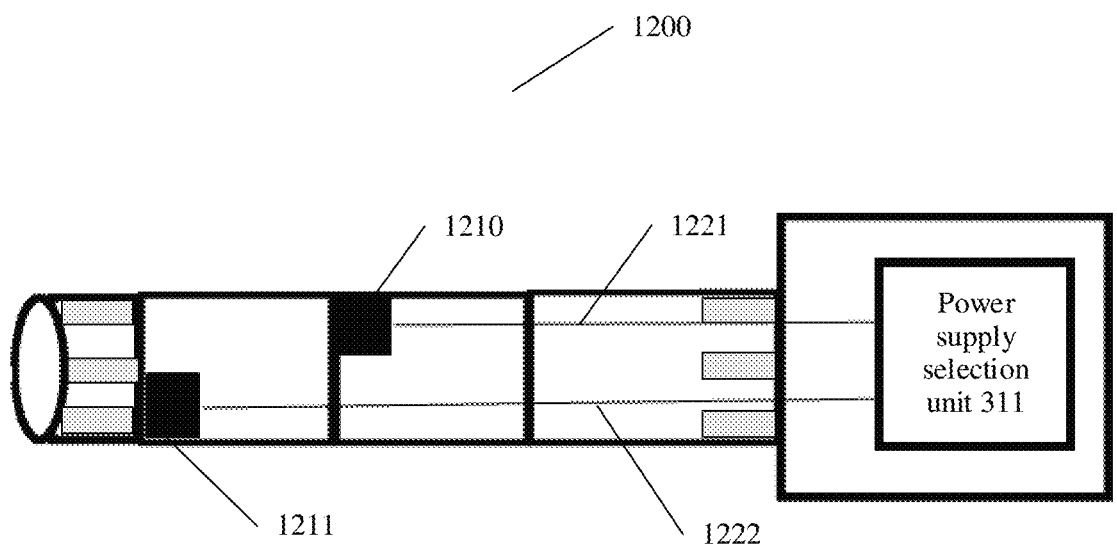
FIG. 12 is an example diagram of a cross-sectional structure of an embodiment of a photoelectric composite socket according to this application.

The following provides a specific description with reference to FIG. 11 and FIG. 12. FIG. 11 is an example diagram of a cross-sectional structure of an embodiment of a photoelectric composite plug according to this application. FIG. 12 is an example diagram of a cross-sectional structure of an embodiment of a photoelectric composite socket according to this application.

Specifically, a bi-directional optical sub-assembly (BOSA) shown in this embodiment implements a connection between the optical fiber included in the first cable and the conversion unit, and a connection between the first transmission line included in the first cable and the power supply selection unit. The BOSA specifically includes a photoelectric composite plug 1100 and a photoelectric composite socket 1200. Specifically, an end of the first cable includes the photoelectric composite plug 1100, and the photoelectric composite interface is the photoelectric composite socket 1200. When the photoelectric composite plug 1100 is inserted into the photoelectric composite socket 1200, a connection between the first cable and the converter is implemented.

First, a structure of the photoelectric composite plug 1100 is described with reference to FIG. 11.

It can be learned from the foregoing description that the first cable shown in this application is a photoelectric composite cable, and the photoelectric composite cable includes an optical fiber 1110, a first positive electrode transmission line 1111, and a first negative electrode transmission line 1112. The optical fiber 1110 is configured to transmit the optical signal with the PON protocol format, the first positive electrode transmission line 1111 is configured to connect to a positive electrode of the first power source, and the first negative electrode transmission line 1112 is configured to connect to a negative electrode of the first power source.

A first end of the photoelectric composite plug 100 includes a first through hole configured to be penetrated by the first cable. It can be learned that there are three first through holes shown in this embodiment, that is, a first through hole 1121 configured to be penetrated by the optical fiber 1110, a second through hole 1122 configured to be penetrated by the first positive electrode transmission line 1111, and a third through hole 1123 configured to be penetrated by the first negative electrode transmission line 1112.

The photoelectric composite plug 1100 includes a first electric conductor 1130 and a second electric conductor 1131. The first electric conductor 1130 is connected to the first positive electrode transmission line 1111. It can be learned that the first electric conductor 1130 may be connected to the positive electrode of the first power source by using the first positive electrode transmission line 1111, and the second electric conductor 1131 is connected to the first negative electrode transmission line 1112. It can be learned that the second electric conductor 1131 may be connected to the negative electrode of the first power source by using the first negative electrode transmission line 1112. Specific disposing manners and shapes of the first electric conductor 1130 and the second electric conductor 1131 are not limited in this embodiment. For example, both the first electric conductor 1130 and the second electric conductor 1131 are attached to a cavity wall of an inner cavity of the photoelectric composite plug 1100, and the first electric conductor 1130 and the second electric conductor 1131 are attached to different locations on the cavity wall, to avoid a short circuit.

A second end of the photoelectric composite plug 1100 includes a connector 1140. A second through hole 1141 is provided penetrating through a cavity bottom of the connector 1140. The optical fiber 1110 in the photoelectric composite plug 1100 penetrates into the first through hole 1121, and penetrates out of the second-through hole 1141 to extend into a cavity of the connector 1140.

A second end of the connector 1140 has an opening 1142. When the photoelectric composite plug 1100 is inserted into the photoelectric composite socket 1200, a position of the opening 1142 is opposite to a position of the first conversion module, so that an optical signal (an optical signal with the PON protocol format) transmitted by the optical fiber 1110 can be transmitted to the first conversion module through the opening 1142 of the connector 1140, to perform protocol conversion, or the optical signal sent by the first conversion module can be transmitted to the optical fiber 1110 through the opening 1142 of the connector 1140. It can be learned that the connector 1140 shown in this embodiment is configured to transmit an optical signal between the optical fiber 1110 and the first conversion module.

To improve transmission efficiency of an optical signal and avoid light leakage in the connector 1140, the connector 1140 shown in this embodiment is made of a non-transparent material. For example, in this embodiment, an example in which the connector 1140 is made of a ceramic material is used for description.

Next, a structure of the photoelectric composite socket 1200 is described with reference to FIG. 12.

The photoelectric composite socket 1200 includes a third electric conductor 1210 and a fourth electric conductor 1211. When the photoelectric composite plug 1100 is inserted into the photoelectric composite socket 1200, the first electric conductor 1130 and the third electric conductor 1210 are attached to each other in a connection relationship, the second electric conductor 1131 and the fourth electric conductor 1211 are attached to each other in a connection relationship, and the third electric conductor 1210 and the fourth electric conductor 1211 are separately connected to the power supply selection unit 311 by using conductive media such as conducting wires (for example, a conducting wire 1221 connected to the third electric conductor 1210 and a conducting wire 1222 connected to the fourth electric conductor 1211 that are shown in FIG. 12). It can be learned that the first power supply current of the first power source may be transmitted to the power supply selection unit 311.

Beneficial effects of the converter provided in this application are described below.

The converter shown in this embodiment is used. When no other component and/or network needs to be arranged between the network device and the terminal device, interaction between the optical signal with the PON protocol format transmitted by the network device and the electrical signal with the USB protocol format transmitted by the terminal device may be implemented. This effectively reduces complexity of the transmission system, can be efficiently applied to a plurality of PON-based scenarios, improves efficiency of signal interaction between the network device and the terminal device, and reduces network architecture costs for signal interaction between the network device and the intermediate device.

In addition, signal interaction between the network device and the terminal device is performed by using the converter, so that long-distance transmission between the network device and the terminal device is effectively implemented, and an amount of data exchanged between the network device and the terminal device can be increased by using the converter.

The network device can implement, by using the photoelectric composite cable connected between the network device and the conversion unit, that the network device transmits, by using a photoelectric composite cable, the optical signal with the PON protocol format to the conversion unit, and can further implement that the network device supplies power to the conversion unit. This effectively ensures that the conversion unit normally works, and can further reduce a quantity of cables connected between the network device and the conversion unit, and reduce complexity of a connection between the network device and the conversion unit.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A first converter comprising a second converter, wherein the first converter is configured to connect to a first cable, the first cable is a photoelectric composite cable, and the first cable comprises:
   an optical fiber configured to transmit an optical signal with a passive optical network (PON) protocol format, and
   a first transmission line configured to transmit a first power supply current, wherein the first transmission line is connected to the second converter, the second converter is configured to connect to a data interface, and the data interface is configured to transmit an electrical signal with a target protocol format;
   wherein the second converter is further configured to:
   obtain the first power supply current using the first transmission line, receive the optical signal with the PON protocol format from the optical fiber, convert the optical signal with the PON protocol format into the electrical signal with the target protocol format, and transmit the electrical signal with the target protocol format to the data interface; and
   wherein the second converter is further configured to: receive the electrical signal with the target protocol format from the data interface, convert the electrical signal with the target protocol format into the optical signal with the PON protocol format, and transmit the optical signal with the PON protocol format to the optical fiber.

2. The first converter according to claim 1, wherein the first converter further comprises a power supply device that is separately connected to the second converter, the data interface, and a photoelectric composite interface, the photoelectric composite interface is connected to the first cable, and the power supply device is configured to obtain the first power supply current from the photoelectric composite interface and to obtain a second power supply current from the data interface.

3. The first converter according to claim 2, wherein the first converter comprises the photoelectric composite interface, the photoelectric composite interface is separately connected to the first transmission line and the power supply device, and the photoelectric composite interface is further separately connected to the optical fiber and the second converter.

4. The first converter according to claim 3, wherein the first converter comprises the first cable.

5. The first converter according to claim 4, wherein the first converter comprises an optical fiber connector, the first cable is connected between the optical fiber connector and the photoelectric composite interface, and the optical fiber connector is configured to transmit the optical signal with the PON protocol format.

6. The first converter according to claim 5, wherein the optical fiber connector is a photoelectric composite connector, and the photoelectric composite connector is further configured to transmit the first power supply current.

7. The first converter according to claim 5, wherein the first cable is connected to both the optical fiber connector and a power supply plug, the first transmission line is connected between the power supply plug and the power supply device, the power supply plug is connected to a first power source, and the power supply plug is configured to transmit, to the power supply device, the first power supply current from the first power source using the first transmission line.

8. The first converter according to claim 7, wherein the optical fiber connector is one of following:
   a ferrule connector (FC) optical fiber connector, a subscriber connector (SC) optical fiber connector, a lucent connector (LC) optical fiber connector, a straight tip (ST) optical fiber connector, or a fiber distributed data interface (FDDI) optical fiber connector.

9. The first converter according to claim 3, wherein the photoelectric composite interface is a photoelectric composite socket, and the photoelectric composite socket is configured to receive a photoelectric composite plug of the first cable;
   a first end of the photoelectric composite plug comprises a first through hole configured to be penetrated by the first cable, a second end of the photoelectric composite plug comprises a connector, a first end of the connector comprises a second through hole configured to be penetrated by the optical fiber, and a second end of the connector comprises an opening, and the optical fiber successively passing through the first through hole and the second through hole extends into the connector; and
   when the photoelectric composite plug is inserted into the photoelectric composite socket, a position of the opening is opposite to a position of the second converter, and the connector is configured to transmit, between the optical fiber and the second converter, the optical signal with the PON protocol format.

10. The first converter according to claim 9, wherein the first transmission line comprises a first positive electrode transmission line and a first negative electrode transmission line;
   the photoelectric composite plug comprises a first electric conductor and a second electric conductor, the first electric conductor is connected to a positive electrode of a first power source using the first positive electrode transmission line, and the second electric conductor is connected to a negative electrode of the first power source using the first negative electrode transmission line; and the photoelectric composite socket comprises a third electric conductor and a fourth electric conductor, when the photoelectric composite plug is inserted into the photoelectric composite socket, the first electric conductor and the third electric conductor are attached to each other in a connection relationship, the second electric conductor and the fourth electric conductor are attached to each other in a connection relationship, and the third electric conductor and the fourth electric conductor are separately connected to the power supply device.

11. The first converter according to claim 2, wherein the first converter comprises the data interface, the first converter further comprises a second transmission line and a data cable, the data interface is connected to the power supply device using the second transmission line, the data interface is connected to the second converter using the data cable, the second transmission line is configured to transmit the second power supply current, and the data cable is configured to transmit the electrical signal with the target protocol format.

12. The first converter according to claim 2, wherein the first converter comprises a second cable and the data interface connected to the second cable, the second cable comprises a second transmission line and a data cable, the second transmission line is separately connected to the power supply device and the data interface, the data cable is separately connected to the second converter and the data interface, the second transmission line is configured to transmit the second power supply current, and the data cable is configured to transmit the electrical signal with the target protocol format.

13. The first converter according to claim 2, wherein the power supply device is further configured to: when the first power supply current and the second power supply current are obtained, transmit the first power supply current to the second converter.

14. The first converter according to claim 2, wherein the power supply device is further configured to transmit, to the second converter, a power supply current that is the first power supply current or the second power supply current and that has a larger value of a preset parameter.

15. The first converter according to claim 14, wherein the preset parameter is a current value, a voltage value, or a power value.

16. The first converter according to claim 1, wherein the data interface is a universal serial bus (USB) interface; the second converter is further configured to: convert the optical signal with the PON protocol format from the optical fiber into an electrical signal with an Ethernet protocol format, convert the electrical signal with the Ethernet protocol format into an electrical signal with a USB protocol format, and transmit the electrical signal with the USB protocol format to the data interface; and the second converter is further configured to: convert the electrical signal with the USB protocol format from the data interface into the electrical signal with the Ethernet protocol format, convert the electrical signal with the Ethernet protocol format into the optical signal with the PON protocol format, and transmit the optical signal with the PON protocol format to the optical fiber.

17. The first converter according to claim 1, wherein the first cable is configured to connect to an optical fiber connector, and the optical fiber connector is configured to transmit the optical signal with the PON protocol format.

18. The first converter according to claim 1, wherein the data interface is one of following:
a USB interface, a USB Type-C interface, a USB-to-serial adapter, a micro power Internet of Things USB adapter, a wireless network Wi-Fi adapter, a high-definition multimedia interface (HDMI) interface, or an Ethernet link aggregation Eth-Trunk interface.

19. The first converter according to claim 1, wherein the data interface is a USB interface, the first converter further comprises a connector, a first end of the connector is connected to the USB interface, and a second end of the connector is disposed as one of following:
a USB Type-C interface, a USB-to-serial adapter, a micro power Internet of Things USB adapter, a wireless network Wi-Fi adapter, a high-definition multimedia interface HDMI interface, or an Ethernet link aggregation Eth-Trunk interface.

20. A transmission system, wherein the transmission system comprises a network device and a terminal device, the network device and the terminal device are connected using a first converter; the first converter comprises a second converter, the first converter is configured to connect to a first cable, the first cable is a photoelectric composite cable, and the first cable comprises:
an optical fiber configured to transmit an optical signal with a passive optical network (PON) protocol format, and
a first transmission line configured to transmit a first power supply current, wherein the first transmission line is connected to the second converter, the second converter is configured to connect to a data interface, and the data interface is configured to transmit an electrical signal with a target protocol format;
wherein the second converter is further configured to: obtain the first power supply current using the first transmission line, receive the optical signal with the PON protocol format from the optical fiber, convert the optical signal with the PON protocol format into the electrical signal with the target protocol format, and transmit the electrical signal with the target protocol format to the data interface; and
wherein the second converter is configured to: receive the electrical signal with the target protocol format from the data interface, convert the electrical signal with the target protocol format into the optical signal with the PON protocol format, and transmit the optical signal with the PON protocol format to the optical fiber.

* * * * *